US012172555B2

(12) United States Patent
Cherukuvada et al.

(10) Patent No.: US 12,172,555 B2
(45) Date of Patent: Dec. 24, 2024

(54) TORSION ASSIST SYSTEM FOR A FOLDING SEAT BACK IN A VEHICLE

(71) Applicant: GM Global Technology Operations LLC, Detroit, MI (US)

(72) Inventors: Venkata Narasimha Rao Cherukuvada, Troy, MI (US); Thomas Gillette, Fenton, MI (US); Xavier Jesus Del Rio, Metepec (MX); Srujan Nelakuditi, Chesterfield Township, MI (US); Alan Garcia, Estado de Mexico (MX); Mark West, Novi, MI (US); Blagoj Dungevski, Sterling Hgts, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 440 days.

(21) Appl. No.: 17/567,329

(22) Filed: Jan. 3, 2022

(65) Prior Publication Data

US 2023/0211710 A1    Jul. 6, 2023

(51) Int. Cl.
*B60N 2/30* (2006.01)
*B60N 2/22* (2006.01)
*B60N 2/68* (2006.01)

(52) U.S. Cl.
CPC ......... *B60N 2/3013* (2013.01); *B60N 2/2222* (2013.01); *B60N 2/686* (2013.01)

(58) Field of Classification Search
CPC .... B60N 2/3013; B60N 2/2222; B60N 2/686; B60N 2/015; B60N 2/36; B60N 2/64
See application file for complete search history.

(56) References Cited

U.S. PATENT DOCUMENTS

| | | | | |
|---|---|---|---|---|
| 5,871,255 A | * | 2/1999 | Harland | B60N 2/36 297/378.13 |
| 8,678,496 B2 | * | 3/2014 | Zorine | B60N 2/36 297/248 |
| 10,207,604 B2 | * | 2/2019 | Stesl | B60N 2/2222 |
| 10,710,487 B2 | * | 7/2020 | Welch | B60N 2/0292 |
| 11,110,828 B2 | * | 9/2021 | Pistilli | B60N 2/36 |
| 2008/0258529 A1 | * | 10/2008 | Maruno | B60N 2/20 297/257 |

(Continued)

FOREIGN PATENT DOCUMENTS

| | | | | |
|---|---|---|---|---|
| DE | 19837543 C1 | * | 7/1999 | ........... B60N 2/2245 |
| DE | 102015212547 A1 | * | 1/2017 | ............... B60N 2/20 |

(Continued)

OTHER PUBLICATIONS

German Application No. 10 2022 126 083.6 filed Oct. 10, 2022; German Office Action dated Dec. 18, 2023; 5 pages.

*Primary Examiner* — Amy R Weisberg
*Assistant Examiner* — Sara Laghlam
(74) *Attorney, Agent, or Firm* — CANTOR COLBURN LLP

(57) ABSTRACT

A seat back system for a vehicle includes a fixed seat support member fixed relative to the vehicle, a seat back frame pivotally mounted relative to the fixed seat support member, and a torsion spring element mounted to the seat back frame. The torsion spring element includes a first end fixed relative to the fixed seat support member and a second end fixed relative to the seat back frame.

20 Claims, 7 Drawing Sheets

(56) References Cited

U.S. PATENT DOCUMENTS

| | | | | |
|---|---|---|---|---|
| 2012/0228910 | A1* | 9/2012 | Kim | B60N 2/1842 |
| | | | | 297/257 |
| 2014/0159449 | A1* | 6/2014 | Kamper | B60N 2/01 |
| | | | | 29/525.01 |
| 2017/0166088 | A1* | 6/2017 | Frye | B60N 2/986 |
| 2021/0129727 | A1* | 5/2021 | Pistilli | B60N 2/3013 |
| 2022/0133043 | A1* | 5/2022 | Tarnowski | A47C 1/027 |
| | | | | 297/374 |

FOREIGN PATENT DOCUMENTS

| | | |
|---|---|---|
| DE | 102019216975 A1 | 5/2021 |
| DE | 102019009183 B4 | 3/2023 |

\* cited by examiner

TORSION ASSIST SYSTEM FOR A FOLDING SEAT BACK IN A VEHICLE

INTRODUCTION

The subject disclosure relates to the art of vehicles and, more particularly, to a torsion assist system for a folding seat back in a vehicle.

Many vehicles include seat backs that fold forward. For example, in a two-door vehicle, a second row seat may fold forward to provide more cargo space or passengers access to a third row seat and then be returned to an upright position for a passenger. Gravity aids a user with folding the seat forward. Returning the seat to the upright position may take more effort. This is particularly true in certain vehicles that may include accessories such as seat back cooling, massage units, and the like that increase seat back weight. The increase in weight may make returning the seat back to the upright position difficult for certain users. Accordingly, it is desirable to provide a system that may assist a user in returning a seat back to an upright position.

SUMMARY

In one non-limiting example, a seat back system for a vehicle includes a fixed seat support member fixed relative to the vehicle, a seat back frame pivotally mounted relative to the fixed seat support member, and a torsion spring element mounted to the seat back frame. The torsion spring element includes a first end fixed relative to the fixed seat support member and a second end fixed relative to the seat back frame.

In addition to one or more of the features described herein the first end of the torsion spring element includes a locking pin that contains rotation of the first and relative to the second end.

In addition to one or more of the features described herein the seat back frame includes a locking pin support, the locking pin extending through and being rotationally fixed to the seat back frame through the locking pin support.

In addition to one or more of the features described herein the fixed seat support member includes an opening that is receptive of the locking pin.

In addition to one or more of the features described herein the locking pin includes an outer surface having a first profile and the opening includes an inner surface having a second profile that substantially matches the first profile.

In addition to one or more of the features described herein another seat back frame is pivotally mounted relative to the fixed seat support member, and another torsion spring element is mounted to the another seat back frame, the another torsion spring element including a first end portion fixed relative to the fixed seat support member and a second end portion fixed relative to the seat back frame.

In addition to one or more of the features described herein the first end includes a coupler receptive of the locking pin, the coupler being fixed relative to the fixed seat support member.

In addition to one or more of the features described herein a guide member is connected with the coupler, the guide member including a first end section extending into the coupler and a second end section including a tapered opening receptive of the locking pin, the guide member being rotationally fixed relative to the locking pin.

In addition to one or more of the features described herein the opening in the fixed seat support member includes an open ended slot.

In addition to one or more of the features described herein an actuator is mounted to the seat back frame, the actuator being operatively connected to the second end of the torsion spring element.

In another non-limiting example, a vehicle includes a body defining a passenger compartment, a door pivotally mounted to the body, and a seat including a seat back system including a fixed seat support member fixed relative to the vehicle, a seat back frame pivotally mounted relative to the fixed seat support member, and a torsion spring element mounted to the seat back frame. The torsion spring element includes a first end fixed relative to the fixed seat support member and a second end fixed relative to the seat back frame.

In addition to one or more of the features described herein the first end of the torsion spring element includes a locking pin that contains rotation of the first and relative to the second end.

In addition to one or more of the features described herein the seat back frame includes a locking pin support, the locking pin extending through and being rotationally fixed to the seat back frame through the locking pin support.

In addition to one or more of the features described herein the fixed seat support member includes an opening that is receptive of the locking pin.

In addition to one or more of the features described herein the locking pin includes an outer surface having a first profile and the opening includes an inner surface having a second profile that substantially matches the first profile.

In addition to one or more of the features described herein another seat back frame is pivotally mounted relative to the fixed seat support member and another torsion spring element is mounted to the another seat back frame, the another torsion spring element including a first end portion fixed relative to the fixed seat support member and a second end portion fixed relative to the seat back frame.

In addition to one or more of the features described herein the first end includes a coupler receptive of the locking pin, the coupler being fixed relative to the fixed seat support member.

In addition to one or more of the features described herein a guide member is connected with the coupler, the guide member including a first end section extending into the coupler and a second end section including a tapered opening receptive of the locking pin, the guide member being rotationally fixed relative to the locking pin.

In addition to one or more of the features described herein the opening in the fixed seat support member includes an open ended slot.

In addition to one or more of the features described herein an actuator is mounted to the seat back frame, the actuator being operatively connected to the second end of the torsion spring element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
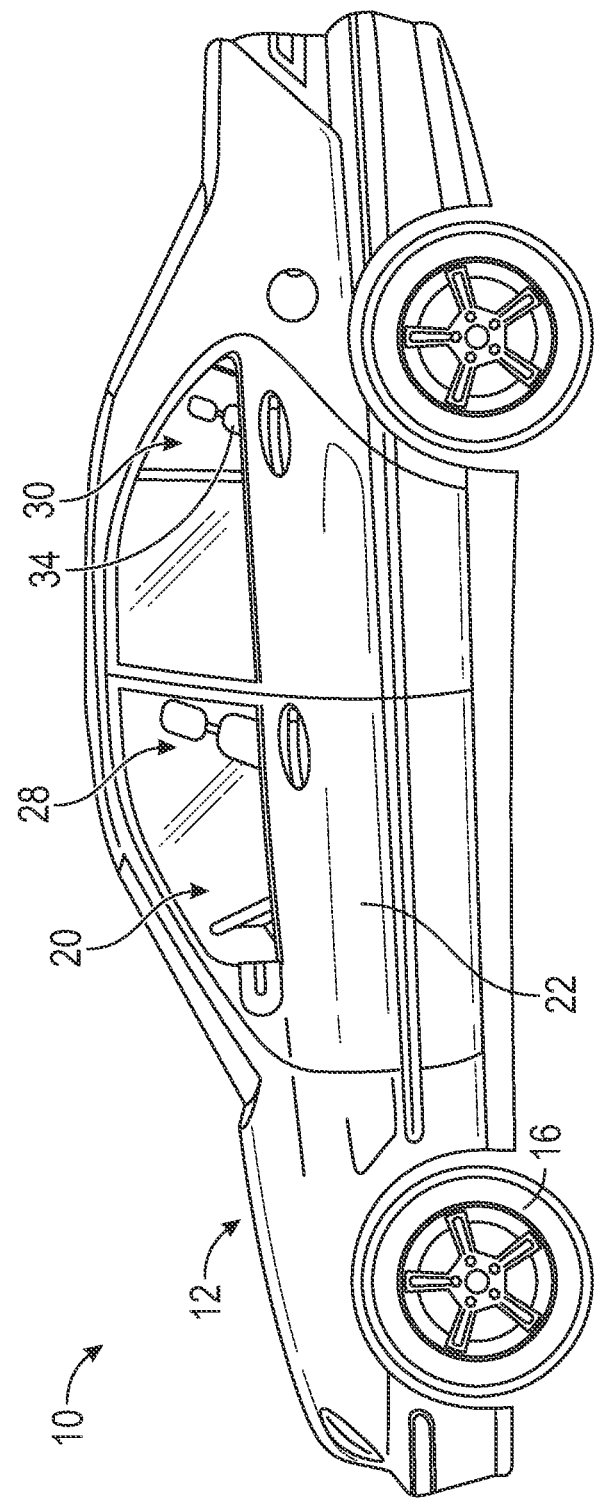
FIG. 1 is a sick view of a vehicle including a torsion assist system for a folding seat back, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that may be accessed by a door 22. A second door (not shown) may be arranged on an opposing side of vehicle 10. Passenger compartment 20 includes a front seat 28 and a rear seat 30. Rear seat 30 may represent a split seat having two seat backs (not separately labeled) that may be folded forward to provide access to a rear compartment (not separately labeled) of vehicle 10. The seat backs include a seat back system 34 that allows for forward folding and also aids in returning a seat back to an upright position.

Figure 2:
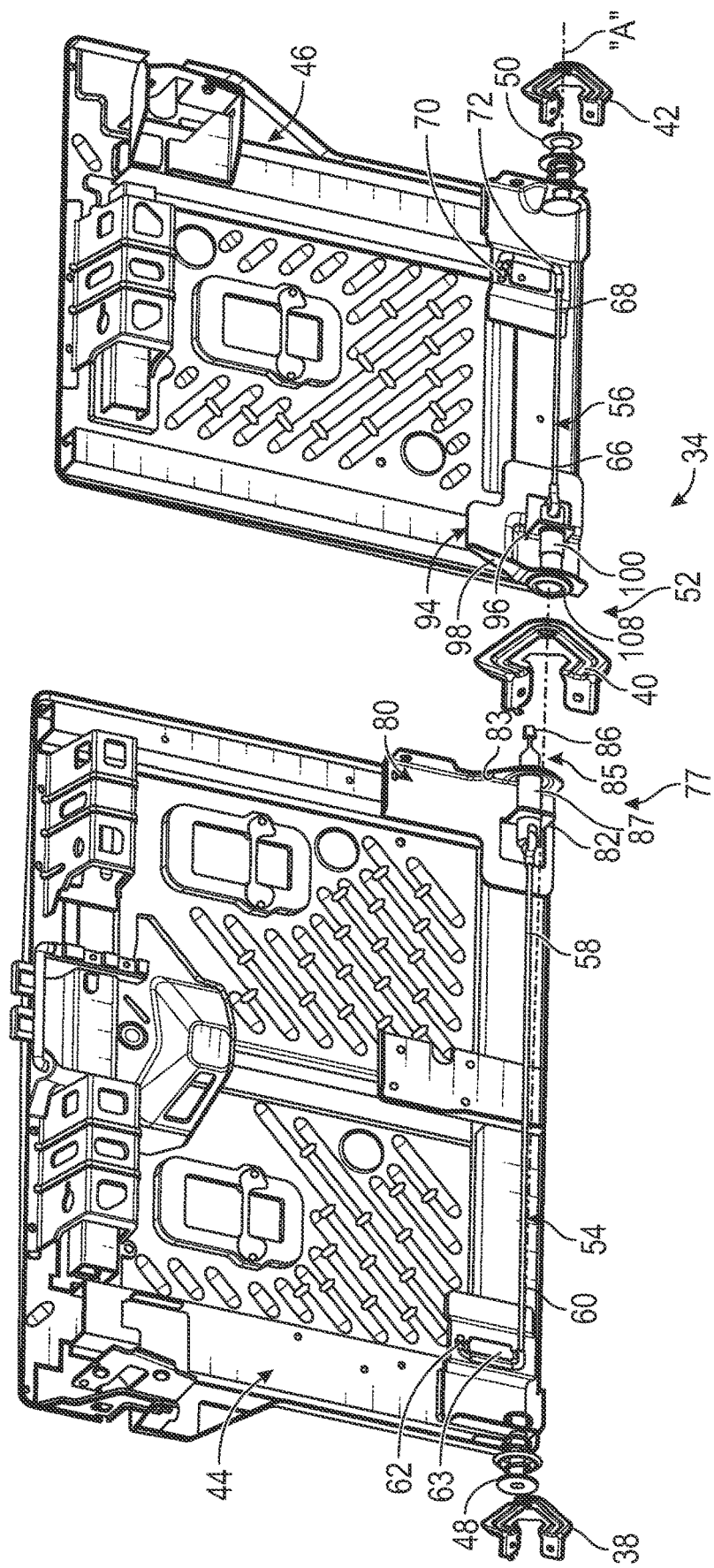
FIG. 2 is a partially disassembled perspective view of the torsion assist system mounted to seat back frames, in accordance with a non-limiting example.
Figure 3:
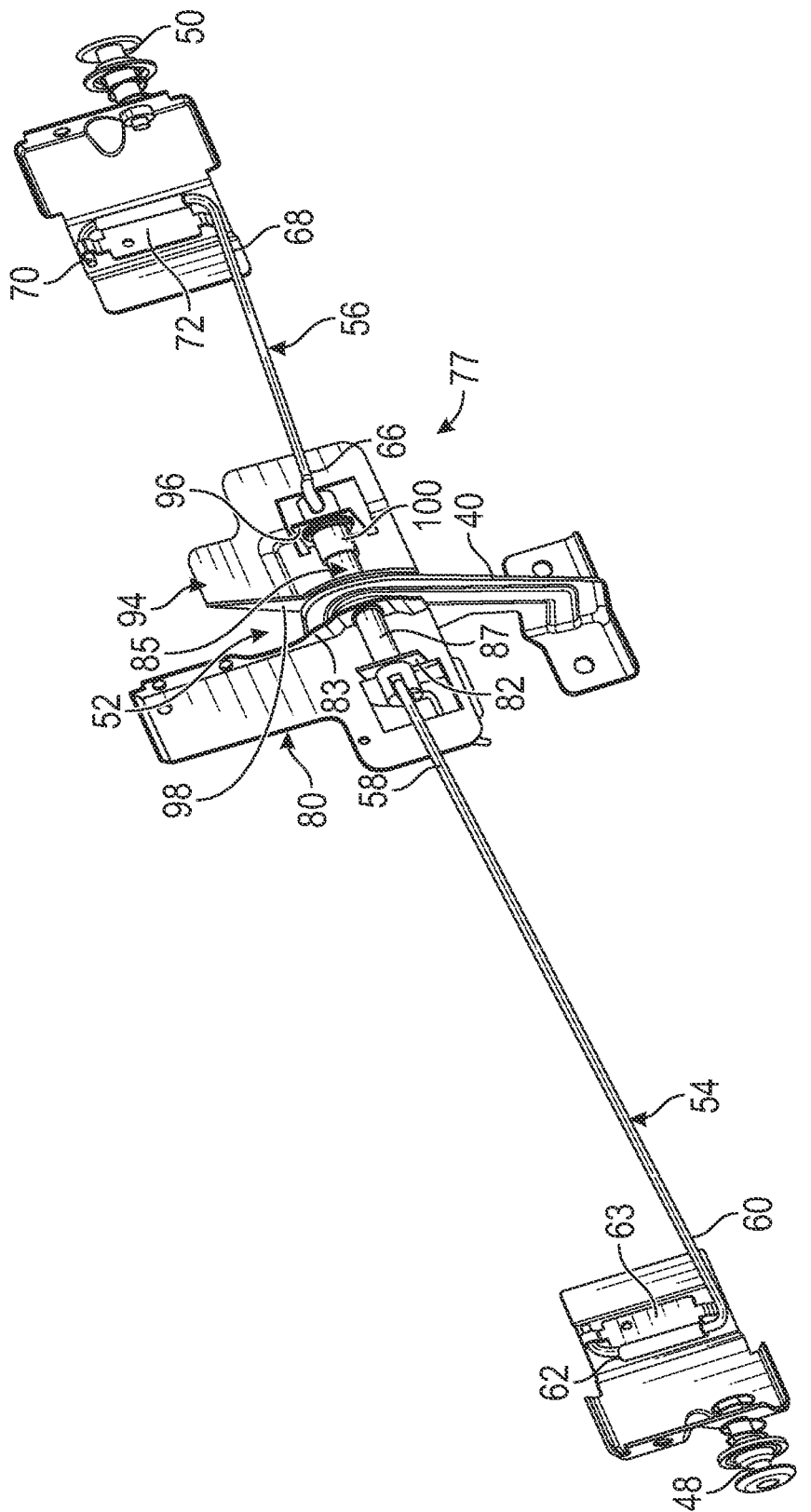
FIG. 3 is a plan view of the torsion assist system, in accordance with a non-limiting example.

In a non-limiting example depicted in FIGS. 2 and 3, seat back system 34 includes a first fixed seat support member 38, a second fixed seat support member 40, and a third fixed seat support member 42. First, second and third fixed support members 38, 40 and 42 may be mounted to a floor (not separately labeled) of passenger compartment 20. A first seat back frame 44 is pivotally mounted between first fixed seat support member 38 and second fixed seat support member 40. A second seat back frame 46 is pivotally connected between second fixed seat support member 40 and third fixed seat support member 42. In a non-limiting example, a first bushing 48 is mounted to first seat back frame 44 and received by first fixed seat support member 38. A second bushing 50 is mounted to second seat back frame 46 and received by third fixed seat support member 42. As will be detailed herein, a biasing system 52 supports first and second seat back frames 44 and 46 at second fixed seat support member 40 and also aids a user in returning first seat back frame 44 and/or second seat back frame 46 to an upright configuration.

In a non-limiting example, biasing system 52 includes a first torsion spring element 54 mounted to first seat back frame 44 and a second torsion spring element 56 mounted to second seat back frame 46. First torsion spring element 54 includes a first end 58 and a second end 60. Second end 60 includes a bend portion 62 that is secured to first seat back frame 44 by a first bracket 63. Second torsion spring element 56 includes a first end portion 66 and a second end portion 68. Second end portion 68 includes a bend portion 70 that is secured to second seat back frame 46 by a second bracket 72.

In a non-limiting example, a spring coupler system 77 connects first end 58 of first torsion spring element 54 with first end portion 66 of second torsion spring element 56 as shown in FIG. 3. Spring coupler system 77 includes a locking pin support 80 coupled to first seat back frame 44. Locking pin support 80 includes a first support element 82 spaced from, and aligned with, a second support element 83. A locking pin 85 is connected to first end 58 of first torsion spring element 54. Locking pin 85 extends through first support element 82 and second support element 83. Locking pin support 80 may rotate relative to locking pin 85 when first seat back frame 44 is pivoted between folded and upright configurations. Locking pin 85 includes tip section 86. In a non-limiting example, tip section 86 includes a first profile or geometry and locking pin 85 includes an outer surface section 87 having a second profile that is distinct from the first profile. In a non-limiting example, the first profile is generally rectangular while the second profile is generally round.

Figure 4:
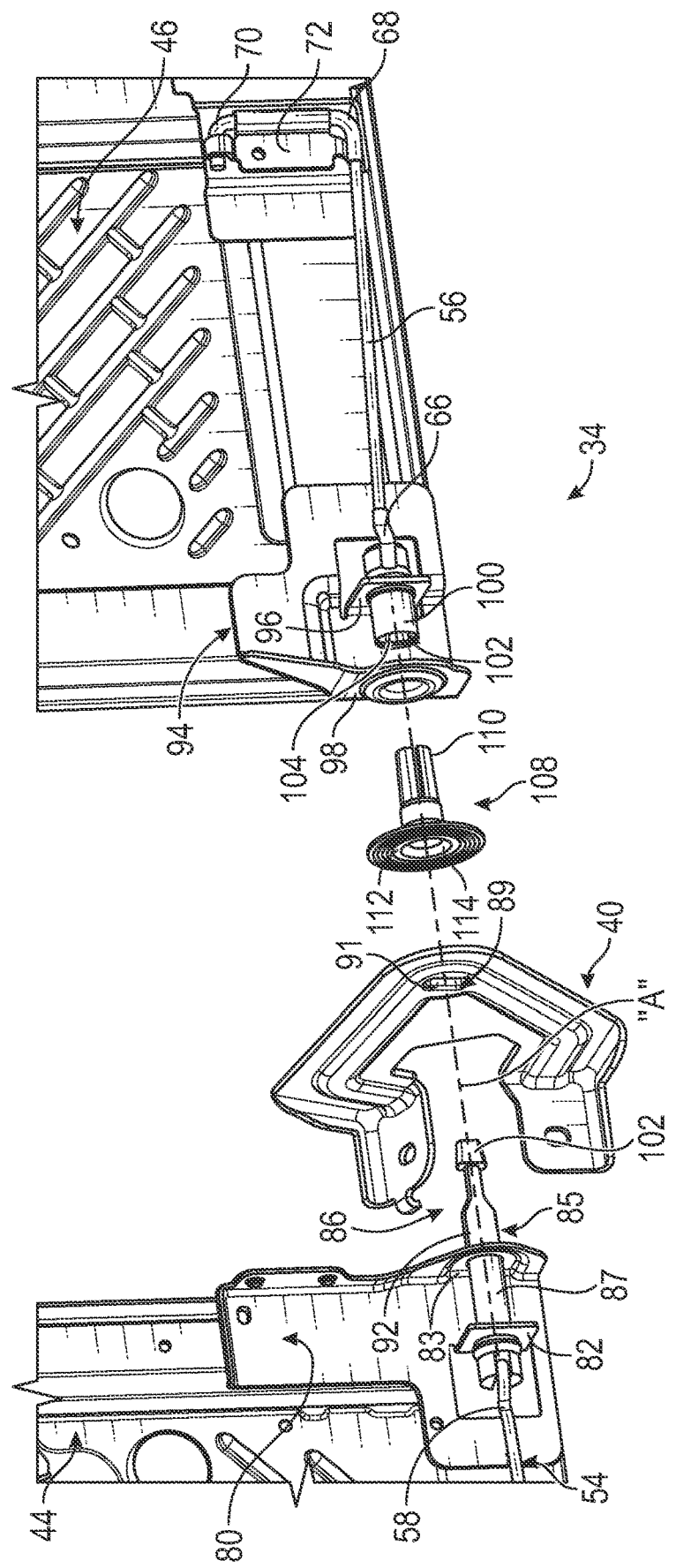
FIG. 4 depicts an exploded view of a connection system for the torsion assist system of FIG. 3, in accordance with a non-limiting example.

As shown in FIG. 4, second fixed seat support member 40 includes an opening 89 having an inner surface 91 defining a shape that corresponds to the first profile. In a non-limiting example, inner surface 91 defines a generally rectangular shape that receives a first section 91 of tip member 86. With this arrangement, locking pin 85 is passed through opening 89 and rotationally locked relative to second fixed seat support member 40. Thus, when first seat back frame 44 is rotated forward, a pre-load or twist is applied to first torsion spring element 54 by virtue of locking pin 85 being fixed at second fixed seat support member 40 and second end 60 being secured by bracket 63.

In a non-limiting example, second seat back frame 46 includes a coupler support 94 having a first support member 96 spaced from, and aligned with, a second coupler support 98. A coupler 100 is connected to first end portion 66 of second torsion spring element 56. First end portion 66 and coupler 100 are supported by first support member 96 and terminate short of second coupler support 98. First support member 96 may rotate relative to coupler 100. In a non-limiting example, coupler 100 acts as an interface to first torsion spring element 54. In a non-limiting example, coupler 100 receives a second section 102 of tip section 86 of locking pin 85. That is, coupler 100 includes a passage 102 shaped to receive second section 102 of tip section 86. Thus, coupler 100, in a non-limiting example, defines a socket 104.

In a non-limiting example, a guide member 108 facilitates alignment with and insertion of locking pin 85 into socket 104. Guide member 108 includes a first end section 110 and a second end section, 112. First end section 110 includes a profile that corresponds to outer surface 87 of tip section 86 and an inner surface (not separately labeled) of socket 104. In this manner, guide member 108 locks coupler 100 to locking pin 85. In a non-limiting example, guide member 108 includes a tapered opening 114 at second end section 112. Tapered opening 114 creates a funnel-like structure that aids in the insertion of locking pin 85 during assembly of seat back system 34.

With this arrangement, folding either first seat back frame 44 or second seat back frame 46 forward about axis "A", causes a twisting of corresponding ones of first torsion spring element 54 and second torsion spring element 56. That is, as first end 58 of first torsion spring element 54 and first end portion 66 of second torsion spring element 56 are fixed, forward rotation of either first seat back frame 44 or second seat back frame 46 causes a twisting of corresponding ones of first torsion spring element 54 and second torsion spring element 56. Thus, in accordance with a non-limiting example, when twisted, first torsion spring element 54 and/or second torsion spring element 56 provide a biasing force that helps a user return first seat back frame 44 and/or second seat back frame 46 to an upright position.

Figure 5:
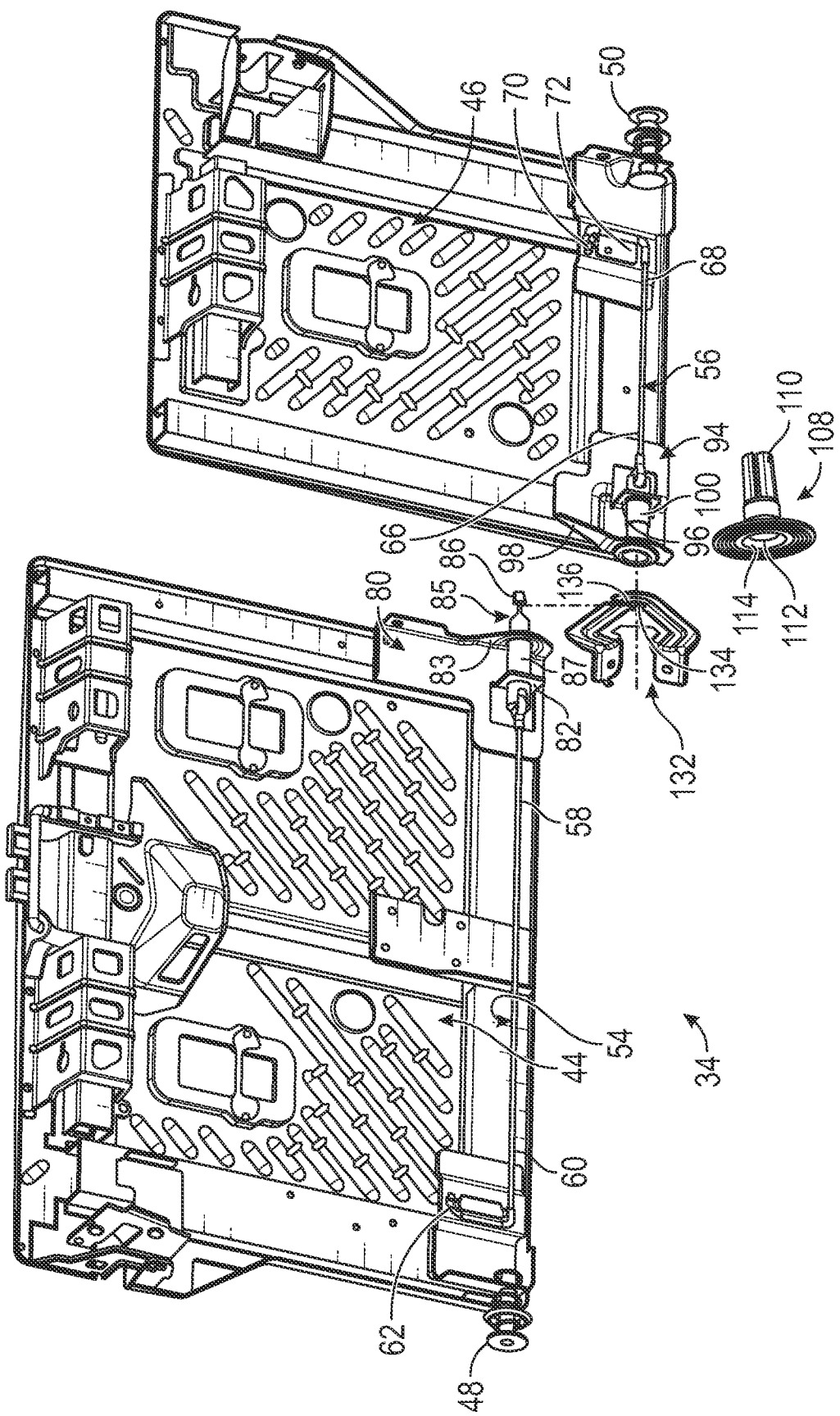
FIG. 5 is a partially disassembled perspective view of the torsion assist system mounted to seat back frames, in accordance with another non-limiting example.

In accordance with another non-limiting example shown in FIG. 5, seat back system 34 includes a second fixed member support member 132 having an open ended slotted opening 134 including an inner surface 136 having a profile that matches the first profile of tip section 86. Open ended slotted opening 134 further aids in the installation of first seat back frame 44 during assembly of seat back system 34. That is, as shown by the dotted lines, locking member 85 may simply be dropped into open ended slotted opening 134 to further simplify installation.

Figure 6:
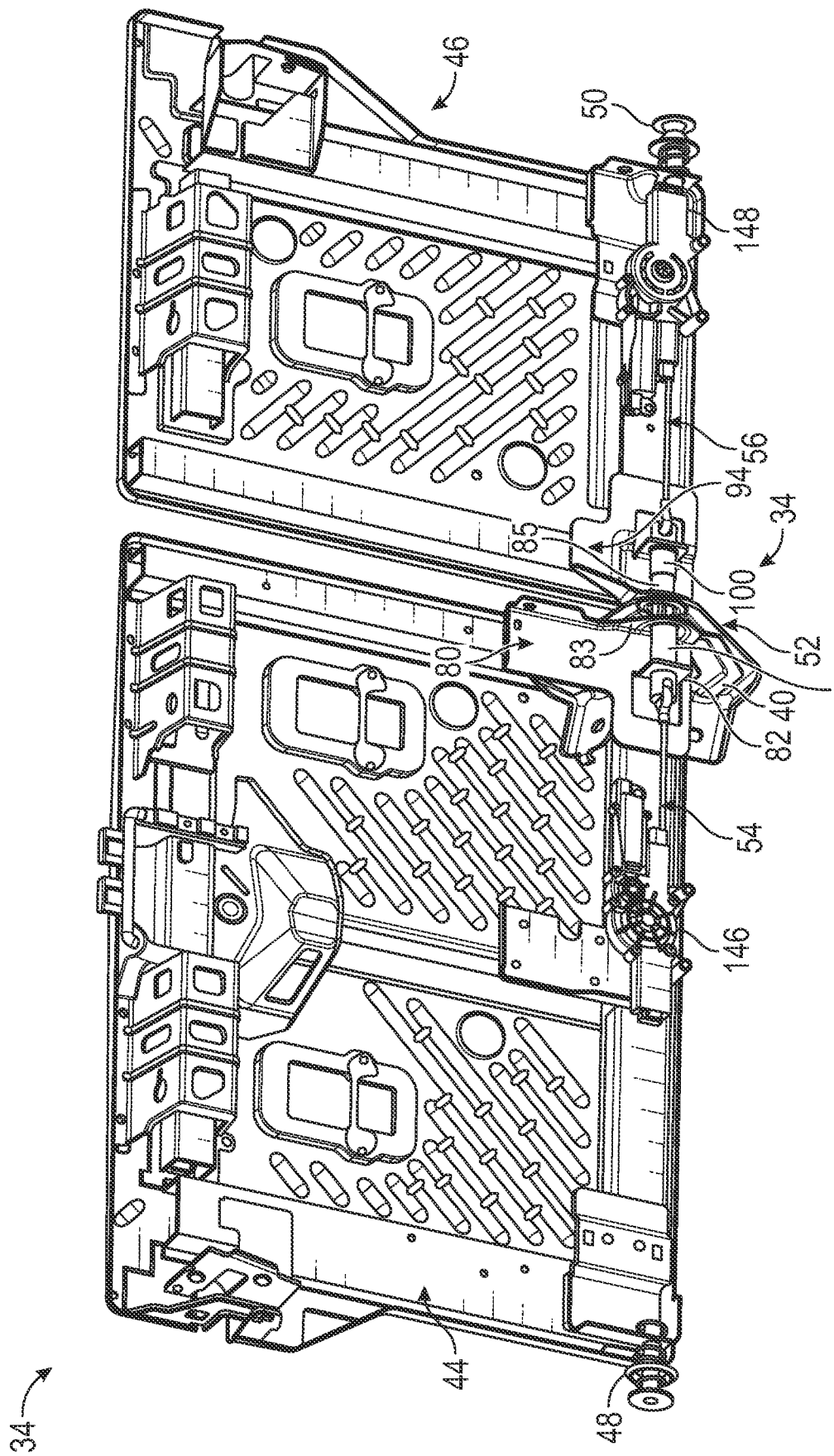
FIG. 6 depicts a partially disassembled perspective view of the torsion assist system mounted to seat back frames, in accordance with yet another non-limiting example.

In yet another non-limiting example shown in FIG. 6, seat back system 34 includes a first actuator 146 connected to first torsion spring element 54 and a second actuator 148 coupled to second torsion spring element 56. First and second actuators 146 and 148 may be selectively activated to, with the aid of first and second torsion spring elements 54 and 56, further assist in returning corresponding ones of first and second seat back frames 44 and 46 to an upright position. In a non-limiting example, seat back 44 and/or 46 is rotated forward loading corresponding ones of torsion spring elements 54 and/or 56. At this point, first actuator 146 and/second actuator 148 may be activated to unwind or unload the corresponding ones of first and second torsion springs 54 and 56 to as to automatically return seat back frame 44 and/or 46 to an upright configuration.

Figure 7:
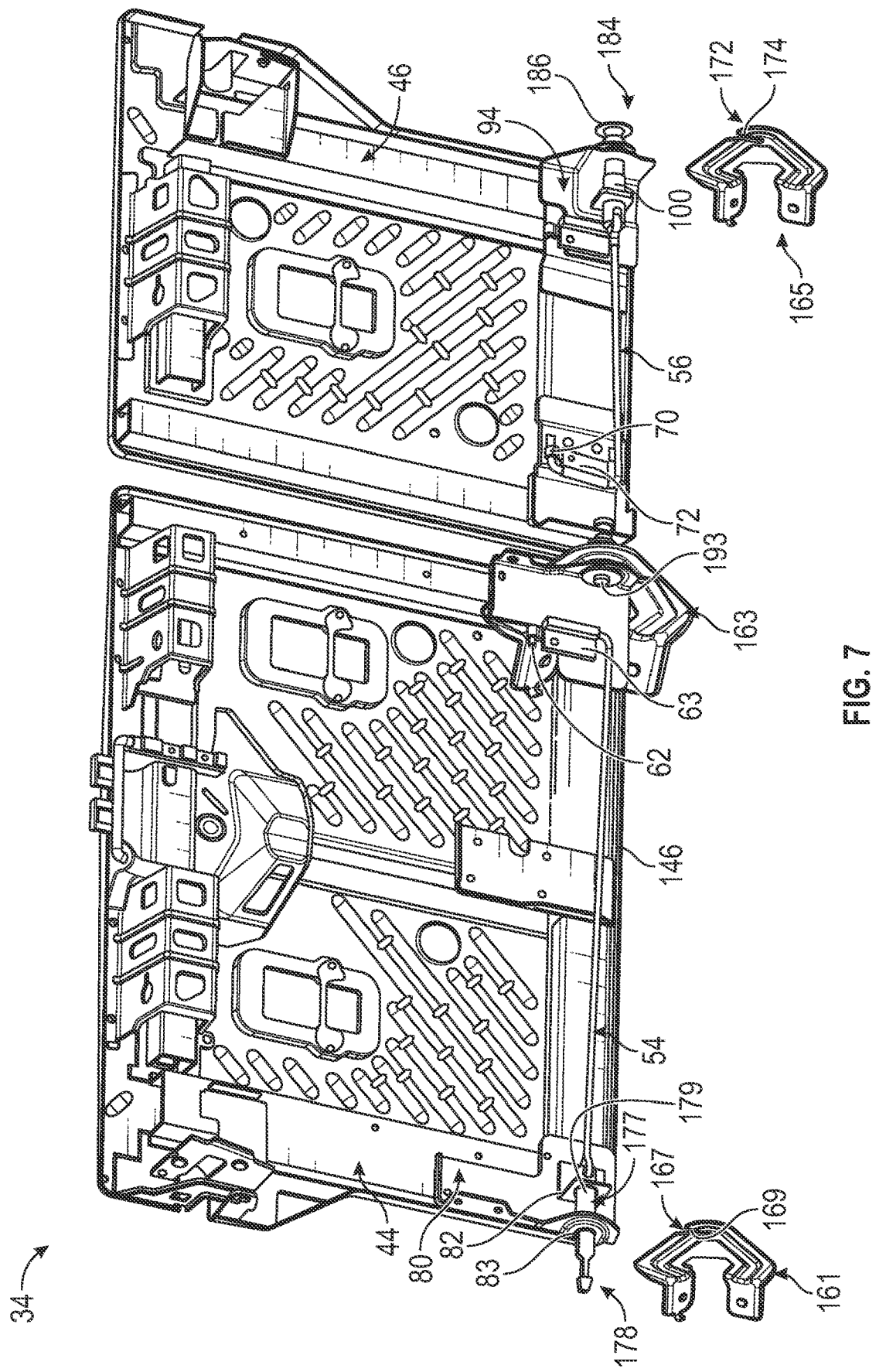
FIG. 7 depicts a partially disassembled perspective view of the torsion assist system mounted to seat back frames, in accordance with still yet another non-limiting example.

In accordance with still another non-limiting example depicted in FIG. 7, seat back system 34 includes a first fixed seat support member 161, a second fixed seat support member 163, and a third fixed seat support member 165. First fixed seat support member 161 includes a first open ended slotted opening 167 including a first inner surface 169 having the first profile. Third fixed seat support member 165 includes a third open ended slotted opening 172 having a third inner surface 174 including the first profile. Second fixed seat support member 163 includes a second open ended slotted opening (not shown). A locking pin 177 having a tip section 178 formed with the first profile is mountable in first opening 167. Locking pin 177 also includes an outer surface 179 having a generally rounded shape. A hub 184 including an outer surface 186 provided with the first profile may be connected to coupler 100 and mounted in third opening 172. A central hub 193 is mountable in the second open ended slotted opening. With this arrangement, seat back system 34 may be assembled prior to installation and simply dropped into place and secured to vehicle 10.

In a non-limiting example, first seat back frame 47 may be rotated from an upright state to a folded state. While transitioning to the folded state first torsion spring element 54 is twisted so as to store mechanical energy. In the folded state, passengers may be able to access areas behind rear seat 30. Seat back frame 44 may then be transitioned to an unfolding state during which mechanical energy is gradually released as first torsion spring element 54 unwinds. The release of energy aids an operator in maneuvering the seat back. From the unfolding state, seat back frame 44 enters a returned state preparing rear seat 30 to receive, for example, passengers.

In another non-limiting example, first seat back frame 47 may be rotates from an upright state to a folded state. While transitioning to the folded state first torsion spring element 54 is twisted so as to store mechanical energy. An operator may then activate first actuator 146 to move seat back frame 44 through the unfolding state to the unfolded state. Mechanical energy stored in first torsion spring element 54 aids in the movement to the returned state. In this manner, first actuator 146 may be sized to be smaller than would be needed without the presence of first torsion spring element 54.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat back system for a vehicle comprising:
    a fixed seat support member fixed relative to the vehicle;
    a first seat back frame pivotally mounted relative to the fixed seat support member;
    a second seat back frame pivotally mounted relative to the fixed seat support member;
    a first torsion spring element mounted to the first seat back frame, the first torsion spring element including a first end fixed relative to the fixed seat support member and a second end fixed relative to the first seat back frame;
    a second torsion spring element mounted to the second seat back frame, the second torsion spring element including a first end portion fixed relative to the fixed seat support member and a second end portion fixed relative to the second seat back frame;
    a locking pin coupled to the first end of the first torsion spring element and rotationally fixed to the first end to contain rotation of the first end relative to the second end;
    a coupler coupled to the first end portion of the second torsion spring element and rotationally fixed to the first end portion to contain rotation of the first end portion relative to the second end portion; and
    a guide member including a first end section inserted into the coupler so as to be rotationally fixed with respect to the coupler, and a second end section including a tapered opening into which the locking pin is inserted so as to be rotationally fixed with respect to the locking pin.

2. The seat back system according to claim 1, wherein the first seat back frame includes a locking pin support, the locking pin extending through and being rotationally fixed to the first seat back frame through the locking pin support.

3. The seat back system according to claim 2, wherein the fixed seat support member includes an opening that is receptive of the locking pin.

4. The seat back system according to claim 3, wherein the locking pin includes an outer surface having a first profile and the opening includes an inner surface having a second profile that substantially matches the first profile.

5. The seat back system according to claim 1, wherein the coupler is fixed relative to the fixed seat support member.

6. The seat back system according to claim 3, wherein the opening in the fixed seat support member includes an open ended slot.

7. The seat back system according to claim 1, further comprising an actuator mounted to the first seat back frame, the actuator being operatively connected to the second end of the first torsion spring element.

8. A vehicle comprising:
a body defining a passenger compartment;
a door pivotally mounted to the body; and
a seat including a seat back system comprising:
a fixed seat support member fixed relative to the vehicle;
a first seat back frame pivotally mounted relative to the fixed seat support member;
a second seat back frame pivotally mounted relative to the fixed seat support member;
a first torsion spring element mounted to the first seat back frame, the first torsion spring element including a first end fixed relative to the fixed seat support member and a second end fixed relative to the first seat back frame;
a second torsion spring element mounted to the second seat back frame, the second torsion spring element including a first end portion fixed relative to the fixed seat support member and a second end portion fixed relative to the second seat back frame;
a locking pin coupled to the first end of the first torsion spring element and rotationally fixed to the first end to contain rotation of the first end relative to the second end;
a coupler coupled to the first end portion of the second torsion spring element and rotationally fixed to the first end portion to contain rotation of the first end portion relative to the second end portion; and
a guide member including a first end section inserted into the coupler so as to be rotationally fixed with respect to the coupler, and a second end section including a tapered opening into which the locking pin is inserted so as to be rotationally fixed with respect to the locking pin.

9. The vehicle according to claim 8, wherein the seat back frame includes a locking pin support, the locking pin extending through and being rotationally fixed to the seat back frame through the locking pin support.

10. The vehicle according to claim 9, wherein the fixed seat support member includes an opening that is receptive of the locking pin.

11. The vehicle according to claim 10, wherein the locking pin includes an outer surface having a first profile and the opening includes an inner surface having a second profile that substantially matches the first profile.

12. The vehicle according to claim 8, wherein the coupler is fixed relative to the fixed seat support member.

13. The vehicle according to claim 10, wherein the opening in the fixed seat support member includes an open ended slot.

14. The vehicle according to claim 8, further comprising an actuator mounted to the first seat back frame, the actuator being operatively connected to the second end of the first torsion spring element.

15. The seat back system according to claim 7, further comprising a second actuator mounted to the second seat back frame, the second actuator being operatively connected to the second end portion of the second torsion spring element.

16. The vehicle according to claim 14, further comprising a second actuator mounted to the second seat back frame, the second actuator being operatively connected to the second end portion of the second torsion spring element.

17. The seat back system according to claim 1, wherein the second seat back frame comprises a coupler support, the coupler support comprising a first support member that supports the coupler, and the first support member being rotatable relative to the coupler.

18. The vehicle according to claim 8, wherein the second seat back frame comprises a coupler support, the coupler support comprising a first support member that supports the coupler, and the first support member being rotatable relative to the coupler.

19. The seat back system according to claim 17, wherein the coupler support comprises a second support member spaced apart from the first support member that supports the guide member, the second support member being rotatable relative to the guide member.

20. The vehicle according to claim 18, wherein the coupler support comprises a second support member spaced apart from the first support member that supports the guide member, the second support member being rotatable relative to the guide member.

* * * * *